Jan. 16, 1951   J. L. DUCHSCHERER ET AL   2,538,301
PULLING DEVICE
Filed Oct. 10, 1947   3 Sheets-Sheet 2
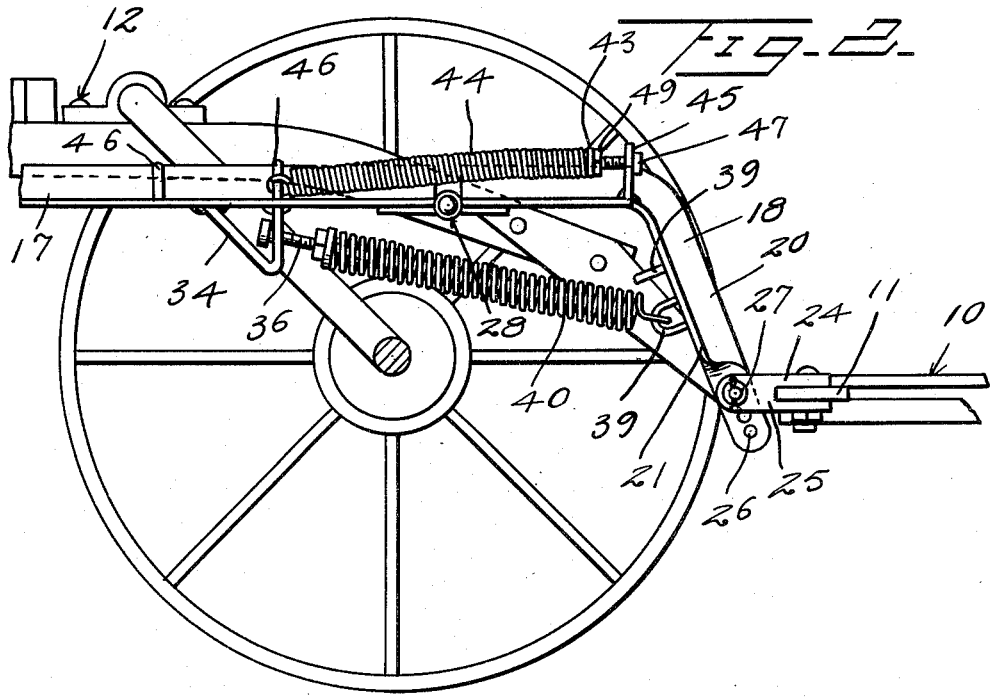
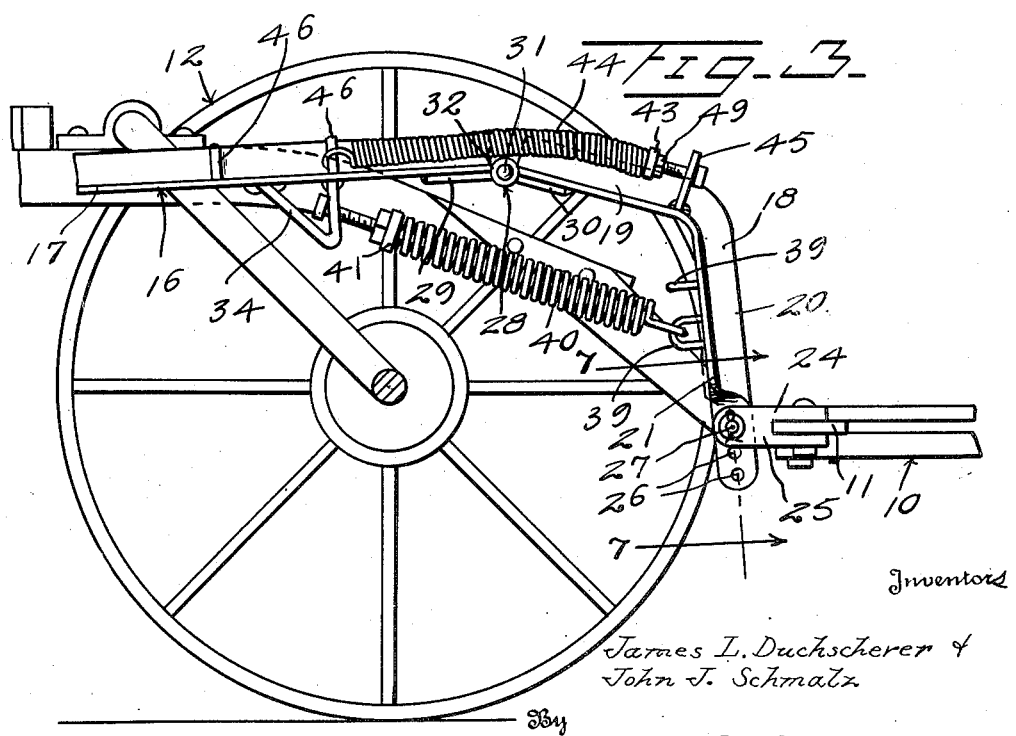
Inventors
James L. Duchscherer &
John J. Schmalz
By
Kimmel & Crowell Attorneys Jan. 16, 1951  J. L. DUCHSCHERER ET AL  2,538,301
PULLING DEVICE
Filed Oct. 10, 1947  3 Sheets-Sheet 3
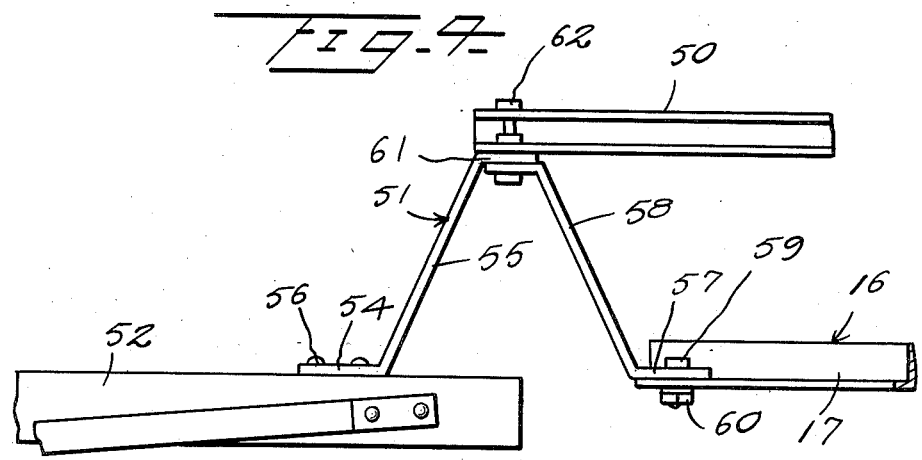
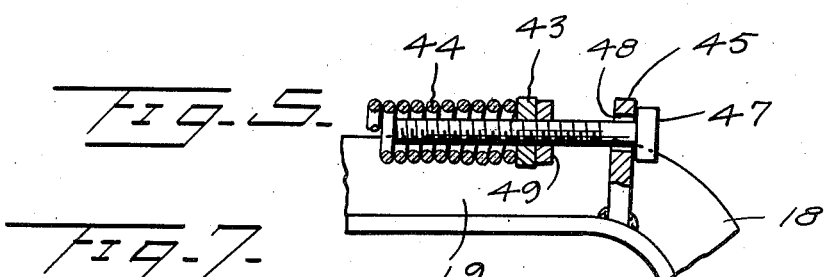
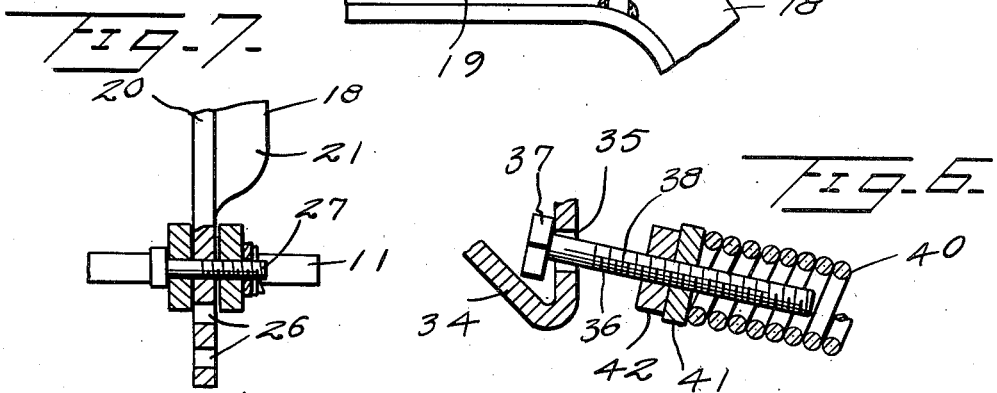
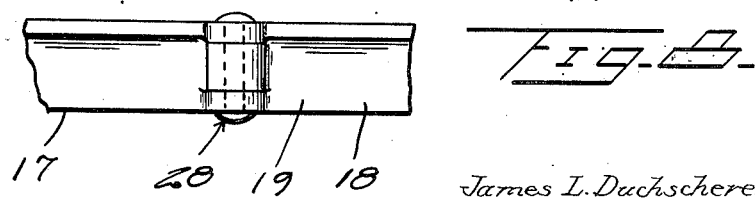
Inventors
James L. Duchscherer &
John J. Schmalz
By Kimmel & Crowell
Attorneys Patented Jan. 16, 1951

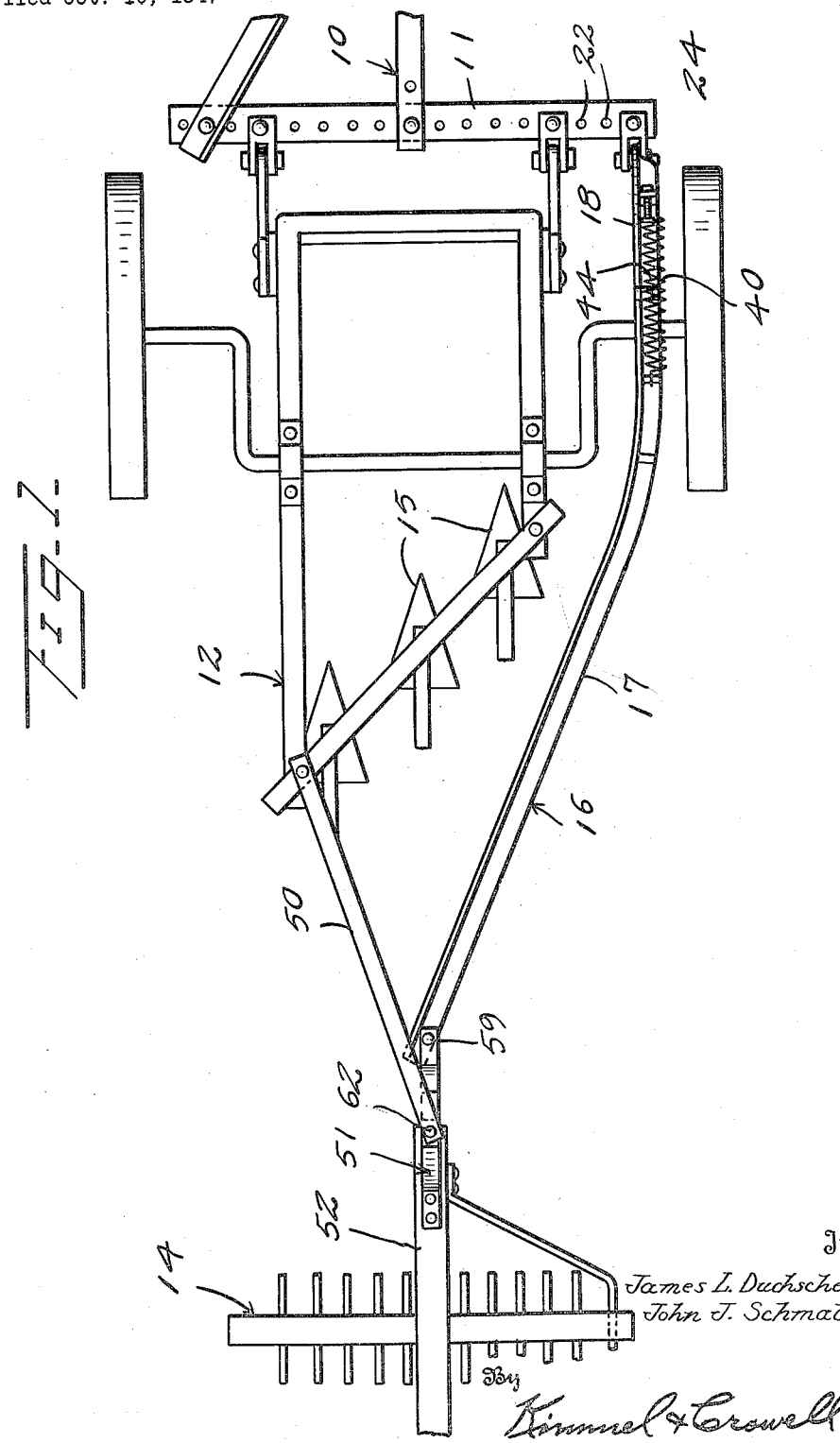

2,538,301

UNITED STATES PATENT OFFICE 2,538,301

PULLING DEVICE

James L. Duchscherer and John J. Schmalz,
Fillmore, N. Dak.

Application October 10, 1947, Serial No. 779,024

1 Claim. (Cl. 97—199)

This invention relates to a flexible tractor hitch.

It is an object of this invention to provide an improved flexible trailer hitch and drawbar for use in drawing a train of farm implements behind a tractor.

It is customary in plowing and seeding a farm to draw a plow, a drill and seeder in a train behind the tractor so the entire seeding work may be accomplished in a single operation. In the use of such a train, the plow occasionally strikes a hidden rock or other obstruction which retards or completely stops its forward travel. As the drill and seeder are not provided with brakes for such an occasion, their forward momentum at this time imposes a great strain on the connecting drawbars, which frequently results in damage to the drawbars. Another object of this invention then is to provide a shock absorbing hitch for connecting the second implement to the first, in which the momentum of the second implement will be absorbed by the hitch on a sudden stop of the first implement, thereby precluding damage to the drawbars or implements.

Still another object of this invention is to provide an improved flexible drawbar of the kind to be more particularly described hereinafter, which is simple in construction, thereby lending itself readily to the economic manufacture and sale thereof.

A further object of this invention is to provide an improved flexible shock absorbing drawbar hitch of this kind in which the flexibility may be readily selectively adjusted for use with various sizes and types of farm implements to attain the most efficient connection for every individual case and use thereof.

With the above and other objects in view, our invention consists in the arrangement, combination and details of construction disclosed in the drawings and specification, and then more particularly pointed out in the appended claim.

In the drawings:

Figure 1 is a top plan view of a plow having a flexible drawbar and hitch constructed according to an embodiment of our invention, Figure 2 is a side elevation, partly broken away, showing the resilient drawbar in the extended or loaded position, Figure 3 is a side elevation, partly broken away, showing the drawbar in the normal position, Figure 4 is a side elevation, partly broken away, showing the connection of the forward end of the drawbar, Figure 5 is a side elevation, partly broken away, and partly in section, showing the adjustment structure of the upper spring, Figure 6 is a fragmentary detail section showing the adjusting screw of the lower spring, Figure 7 is a fragmentary detail section taken on the line 7—7 of Figure 3, Figure 8 is a bottom plan view, partly broken away, of the pivoted connection between the front and rear end of the drawbar.

Referring to the drawings, the numeral 10 designates generally a drawbar connected at one end to a tractor, not shown in the drawings, and at the rear end to a drawbar attaching member 11 fixed on a plow.

Frequently in the use of power driven farm implements it is the custom to provide a train of farm implements behind a tractor to simultaneously complete the several necessary operations. As an example, the plow 12 is connected behind a tractor and a packer and a drill 14 is drawn by the plow, and a seeder may be connected to the rear end of the packer. The packer in such a train would be connected to the plow 12 by a separate drawbar. In the operation of this train of farm implements, as the plow 12 is formed with plow blades 15 which extend downwardly into the earth, frequently the plow blades come into engagement with hidden rocks or other obstructions which cause the sudden stopping of the plow and members supported behind the plow.

Suitable yielding connections are provided for connecting the front end of the drawbar 10 to the tractor for breaking the connection between the drawbar 10 and the tractor when the plow 12 is suddenly stopped. The momentum of the other implements, as the drill and seeder, is not provided for in the usual arrangement. When the plow 12 stops suddenly, the tractor is free to go on so that the drawbar 10 and the tractor hitch are relieved of any undue strain. However, the momentum of the subsequent implements in the train continues to impose a heavy strain on the drawbars of the following implements in a direction opposite from that for which the drawbars are designed. This undue stress frequently results in the failure of the drawbars or attaching structure, or a permanent distortion thereof.

With the use of a drawbar constructed according to an embodiment of this invention, the drawbar is so constructed and arranged to absorb this undue stress imposed by the momentum of the following farm implements in the train.

The drawbar 16 which is used to connect the drill 14 or second farm implement, to the plow 12 or first farm implement of the train, is formed in two sections 17 and 18. The front section 18 is formed in an inverted L-shape, having an upper substantially horizontal arm 19 and a downwardly extending vertical arm 20 at the forward end of the arm 19. The bars 17 and 18 are preferably formed of an L-shaped angle iron to provide the maximum strength for such a drawbar.

The transverse flange 21 of the vertical arm 20 on the forward bar 18 is cut away at the lower end to provide for the attachment of the bar 18 to the plow 12. The connecting bar 11 on the front end of the plow 12 is provided with a plurality of horizontally disposed openings 22 for attachment of suitable drawbars.

A bifurcated connecting member 24 is fixed on the arm 11 at one end thereof, on one side of the plow 12, having the spaced apart arms 25 thereof extending rearwardly of the arm 11. The lower end of the arm 20 is provided with a plurality of vertically spaced apart openings 26 through a selected one of which a connecting pin 27 is adapted to be engaged, for engagement through the arms 25 of the connector 24. The selection of the opening 26 through which the pin 27 is to be engaged is determined by the size of the particular implement with which the drawbar 16 is used.

The forward bar 17 is pivotally connected at its rear end to the rear end of the horizontal arm 19 of the front bar 18, and at its rear end is connected to the connection of the trailing implement 14. A hinge 28 is provided between the abutting ends of the bars 17 and 18, having a leaf 29 carried by the bar 17, and a leaf 30 fixed on the arm 19 of the bar 18. A hinge pin 31 extends loosely through the barrel 32 of the hinge carried by the leaves 29 and 30.

A downwardly extending connecting member 34 is fixed on the rear end of the bar 17 spaced forwardly from the hinge 28. The connector member 34 is substantially V-shaped, having the upper divergent ends thereof fixed to the horizontal flange of the bar 17, and the forward arm of the connector 34 is formed with an opening 35 therethrough, through which a bolt 36 is adapted to loosely engage. The head 37 of the bolt 36 is disposed between the arms of the connector 34 and the shank 38 extends rearwardly thereof.

A pair of U-shaped hooks 39 are fixed on the rear side of the arm 20 on the bar 18. The hooks 39 are vertically spaced apart and a spring 40 is provided for engagement at one end with a selected one of the hooks 39. A plate 41 is welded on one end of the spring 40 and is formed with a threaded opening therethrough, with which the threaded shank 38 of the bolt 36 is adapted to be engaged. The bolt 36 then extends within the convolutions of the spring 40.

A lock nut 42 is threadably engaged on the bolt 36 rearwardly of the plate 41 for locking the bolt 36 in selected threaded engagement with the spring 40. The tension of the spring 40 may be adjusted by rotation of the bolt 36 in the plate 41 and a great adjustment for the spring is provided by selective engagement of the forward end of the spring with a selected hook 39. The tension of the spring 40 constantly urges the bars 17 and 18 together downwardly, below the hinge 28, with the ends thereof in a downwardly divergent relation. This downwardly divergent relation of the bars 17 and 18 is shown in Figure 3, which is the normal position of the drawbar 16 when it is not under a drawing tension.

A spring 44 is provided on the upper side of the bars 17 and 18 and extends across the hinge 28.

A plate 45 is fixed on the bar 18 forwardly of the hinge 28, and a hook 46 is fixed on the bar 17 rearwardly of the hinge. The rear end of the spring 44 is connected with the hook 46 and the front end of the spring 44 is adjustably connected to the plate 45.

A plate 43 is fixed on the front end of the spring 44 and is provided with a threaded opening therethrough. A bolt 47 extends through the opening 48 of the plate 45 for threaded engagement in the plate 43. A lock nut 49 is threadably engaged on the bolt 47 for locking the bolt in threaded adjusted position relative to the spring 44. The tension of the spring 44 is thus selectively adjusted by means of the bolt 47 and the plate 43.

The tension of the spring 44 constantly biases the bars 17 and 18 into horizontal alignment when the bars are disposed in a downwardly divergent relation relative to the pivot 28. Normally the tension of the spring 44 is less than the tension of the spring 40 so that the bars 17 and 18 are normally disposed in a downwardly divergent relation relative to the pivot 28.

When the train which is formed of the tractor, the plow, and the drill 14 are moving in a forward direction, the bars 17 and 18 are disposed in substantially horizontal alignment as shown in Figure 2 of the drawings. When a plow blade 15 engages an obstruction and suddenly stops the plow 12, the drawbar 10 is disengaged from the tractor by means, not shown in the drawing, and the resilient drawbar 16 will absorb the momentum of the moving implements behind the plow 12.

As no brakes or other means are provided for suddenly stopping the trailing implements, a sudden stoppage of the plow 12 will impose a forward force on the drawbar 16. The hinge 28 and springs 40 and 44 are provided for absorbing this momentum and smoothly stopping the trailing implements. As the plow stops and the implements continue to move forward, the bars 17 and 18 will pivot about the pin 31, thus disposing the arms 17 and 18 in exaggerated downwardly divergent relative position with the forward end of the arm 17 moving forward relative to the pivot 27 and connection to the arm 11. This forward movement will continue until the momentum is completely absorbed. At this time the tension on the spring 40 will be substantially relaxed and a large tension will be imposed on the spring 44.

When the train has come to a stop, the tension of the spring 44 will return the drawbar 16 to the normal relaxed position shown in Figure 3. As the plow 12 is normally provided with a drawbar 50 behind the rear end thereof in the forward connection of the trailing drill 14, a connecting means for connecting both the drawbar 50 and drawbar 16 must be provided. An inverted coupling member 51 formed in an inverted V-shape is fixed at one end to the drawbar 52 on the drill 14. The lower end as 54 of one arm 55 of the connector 51 is secured to the drawbar 52 by bolts 56 or other suitable fastening devices. The lower divergent end 57 of the other arm 58 of the connector 51 is formed with an opening through which a pivot pin 59 is engaged. The pin 59 also engages through the rear end of the drawbar 16 for pivotally connecting the drawbar 16 to the connector 51.

A nut 60 is provided on the lower end of the bolt 59 for securing the drawbar 16 to the arm 58. The drawbar 50 which extends rearwardly from the plow 12 at an angle to the direction of movement of the train, is pivotally connected to the apex 61 of the connector 51 by a pivot bolt 62.

We do not mean to confine ourselves to the exact details of construction herein disclosed, but claim all variations falling within the purview of the appended claim.

Having thus described our invention, what we claim is:

A flexible shock absorbing drawbar comprising a horizontal bar, means carried by one end of said bar for attachment to the vehicle to be drawn, an inverted L-shaped bar having a horizontal arm and a vertical arm depending from one end thereof, means pivotally connecting said bars together at the other ends thereof, a tensioned spring connected to said arms across the pivot on the lower side thereof biasing said bars in a normal downwardly divergent relation, means for varying the tension of said spring, a second tension spring connected between said bars across the pivot on the upper side thereof constantly urging said bars to a horizontally aligned position, means for varying the tension of said second spring, and means carried by the lower end of said vertical arm including a horizontally disposed pivot pin engaging through said lower end for pivotally securing the L-shaped bar to a vehicle.

JAMES L. DUCHSCHERER.
JOHN J. SCHMALZ.

REFERENCES CITED

The following references are of record in the file of this patent:

UNITED STATES PATENTS

| Number | Name | Date |
|---|---|---|
| 351,684 | Avery et al. | Oct. 26, 1886 |
| 1,381,041 | Warner | June 7, 1921 |
| 1,877,126 | Greer | Sept. 13, 1932 |
| 2,092,597 | Benjamin et al. | Sept. 7, 1937 |

FOREIGN PATENTS

| Number | Country | Date |
|---|---|---|
| 558,526 | Germany | Sept. 8, 1932 |
| 230,654 | Great Britain | Mar. 19, 1925 |